US012688473B2

(12) United States Patent
Liubyvyi

(10) Patent No.: US 12,688,473 B2
(45) Date of Patent: Jul. 21, 2026

(54) TECHNIQUES FOR WORKFORCE MANAGEMENT IN A TASK ASSIGNMENT SYSTEM

(71) Applicant: AFINITI AI LIMITED, Dublin (IE)

(72) Inventor: Denys Liubyvyi, Washington, DC (US)

(73) Assignee: AFINITI AI LIMITED, Dublin (IE)

( * ) Notice: Subject to any disclaimer, the term of this patent is extended or adjusted under 35 U.S.C. 154(b) by 0 days.

(21) Appl. No.: 18/615,815

(22) Filed: Mar. 25, 2024

(65) Prior Publication Data

US 2024/0311714 A1     Sep. 19, 2024

Related U.S. Application Data

(63) Continuation of application No. 17/572,030, filed on Jan. 10, 2022, now Pat. No. 11,972,376, which is a
(Continued)

(51) Int. Cl.
*G06Q 10/0631*     (2023.01)
*G06Q 10/0639*     (2023.01)

(52) U.S. Cl.
CPC ................. *G06Q 10/063114* (2013.01); *G06Q 10/06312* (2013.01); *G06Q 10/06398* (2013.01)

(58) Field of Classification Search
CPC ..... G06Q 10/063114; G06Q 10/06312; G06Q 10/06398
(Continued)

(56) References Cited

U.S. PATENT DOCUMENTS 5,155,763 A     10/1992  Bigus et al.
5,206,903 A      4/1993  Kohler et al.
(Continued)

FOREIGN PATENT DOCUMENTS

AU     2008349500 C1     5/2014
AU     2009209317 B2     5/2014
(Continued)

OTHER PUBLICATIONS

Anonymous. (2006) "Performance Based Routing in Profit Call Centers," The Decision Makers' Direct, located at www.decisioncraft. com, Issue Jun. 2002 (3 pages).
(Continued)

*Primary Examiner* — Abdallah A El-Hage Hassan
(74) *Attorney, Agent, or Firm* — Rothwell, Figg, Ernst & Manbeck, P.C.

(57)     ABSTRACT

Techniques for workforce management in a task assignment system are disclosed. In one particular embodiment, the techniques may be realized as a method for workforce management in a task assignment system comprising: determining, by at least one computer processor configured to operate in the task assignment system, a first efficiency level of a first task assignment strategy for a first number of agents to be employed in the task assignment system; determining, by the at least one computer processor, a second efficiency level of a second task assignment strategy for a second number of agents to be employed in the task assignment system; comparing, by the at least one computer processor, the first and second efficiency levels; and selecting, by the at least one computer processor, one of the first and second numbers of agents having the higher of the first and second efficiency levels.

11 Claims, 5 Drawing Sheets

Task Assignment System
100

Related U.S. Application Data continuation of application No. 15/993,498, filed on May 30, 2018, now Pat. No. 11,250,359.

(58) Field of Classification Search
USPC ........................................................ 705/7.15
See application file for complete search history.

(56) References Cited

U.S. PATENT DOCUMENTS

| | | | |
|---|---|---|---|
| 5,327,490 A | 7/1994 | Cave | |
| 5,537,470 A | 7/1996 | Lee | |
| 5,702,253 A | 12/1997 | Bryce et al. | |
| 5,825,869 A | 10/1998 | Brooks et al. | |
| 5,903,641 A | 5/1999 | Tonisson | |
| 5,907,601 A | 5/1999 | David et al. | |
| 5,926,538 A | 7/1999 | Deryugin et al. | |
| 6,049,603 A | 4/2000 | Schwartz et al. | |
| 6,052,460 A | 4/2000 | Fisher et al. | |
| 6,064,731 A | 5/2000 | Flockhart et al. | |
| 6,088,444 A | 7/2000 | Walker et al. | |
| 6,163,607 A | 12/2000 | Bogart et al. | |
| 6,222,919 B1 | 4/2001 | Hollatz et al. | |
| 6,292,555 B1 | 9/2001 | Okamoto | |
| 6,324,282 B1 | 11/2001 | McIllwaine et al. | |
| 6,333,979 B1 | 12/2001 | Bondi et al. | |
| 6,389,132 B1 | 5/2002 | Price | |
| 6,389,400 B1 | 5/2002 | Bushey et al. | |
| 6,408,066 B1 | 6/2002 | Andruska et al. | |
| 6,411,687 B1 | 6/2002 | Bohacek et al. | |
| 6,424,709 B1 | 7/2002 | Doyle et al. | |
| 6,434,230 B1 | 8/2002 | Gabriel | |
| 6,496,580 B1 | 12/2002 | Chack | |
| 6,504,920 B1 | 1/2003 | Okon et al. | |
| 6,519,335 B1 | 2/2003 | Bushnell | |
| 6,535,600 B1 | 3/2003 | Fisher et al. | |
| 6,535,601 B1 | 3/2003 | Flockhart et al. | |
| 6,570,980 B1 | 5/2003 | Baruch | |
| 6,587,556 B1 | 7/2003 | Judkins et al. | |
| 6,603,854 B1 | 8/2003 | Judkins et al. | |
| 6,639,976 B1 | 10/2003 | Shellum et al. | |
| 6,661,889 B1 | 12/2003 | Flockhart et al. | |
| 6,704,410 B1 | 3/2004 | McFarlane et al. | |
| 6,707,904 B1 | 3/2004 | Judkins et al. | |
| 6,714,643 B1 | 3/2004 | Gargeya et al. | |
| 6,744,878 B1 | 6/2004 | Komissarchik | |
| 6,763,104 B1 | 7/2004 | Judkins et al. | |
| 6,774,932 B1 | 8/2004 | Ewing et al. | |
| 6,775,378 B1 | 8/2004 | Villena et al. | |
| 6,798,876 B1 | 9/2004 | Bala | |
| 6,829,348 B1 | 12/2004 | Schroeder et al. | |
| 6,832,203 B1 | 12/2004 | Villena et al. | |
| 6,859,529 B2 | 2/2005 | Duncan et al. | |
| 6,922,466 B1 | 7/2005 | Peterson et al. | |
| 6,937,715 B2 | 8/2005 | Delaney | |
| 6,956,941 B1 | 10/2005 | Duncan et al. | |
| 6,970,821 B1 | 11/2005 | Shambaugh et al. | |
| 6,978,006 B1 | 12/2005 | Polcyn | |
| 7,023,979 B1 | 4/2006 | Wu et al. | |
| 7,039,166 B1 | 5/2006 | Peterson et al. | |
| 7,050,566 B2 | 5/2006 | Becerra et al. | |
| 7,050,567 B1 | 5/2006 | Jensen | |
| 7,062,031 B2 | 6/2006 | Becerra et al. | |
| 7,068,775 B1 | 6/2006 | Lee | |
| 7,092,509 B1 | 8/2006 | Mears et al. | |
| 7,103,172 B2 | 9/2006 | Brown et al. | |
| 7,158,628 B2 | 1/2007 | McConnell et al. | |
| 7,184,540 B2 | 2/2007 | Dezonno et al. | |
| 7,209,549 B2 | 4/2007 | Reynolds et al. | |
| 7,231,032 B2 | 6/2007 | Nevman et al. | |
| 7,231,034 B1 | 6/2007 | Rikhy et al. | |
| 7,236,584 B2 | 6/2007 | Torba | |
| 7,245,716 B2 | 7/2007 | Brown et al. | |
| 7,245,719 B2 | 7/2007 | Kawada et al. | |
| 7,266,251 B2 | 9/2007 | Rowe | |
| 7,269,253 B1 | 9/2007 | Wu et al. | |
| 7,353,388 B1 | 4/2008 | Gilman et al. | |
| 7,372,952 B1 | 5/2008 | Wu et al. | |
| 7,398,224 B2 | 7/2008 | Cooper | |
| 7,593,521 B2 | 9/2009 | Becerra et al. | |
| 7,676,034 B1 | 3/2010 | Wu et al. | |
| 7,725,339 B1 * | 5/2010 | Aykin | G06Q 10/10 |
| | | | 705/7.14 |
| 7,734,032 B1 | 6/2010 | Kiefhaber et al. | |
| 7,798,876 B2 | 9/2010 | Mix | |
| 7,826,597 B2 | 11/2010 | Berner et al. | |
| 7,864,944 B2 | 1/2011 | Khouri et al. | |
| 7,899,177 B1 | 3/2011 | Bruening et al. | |
| 7,916,858 B1 | 3/2011 | Heller et al. | |
| 7,940,917 B2 | 5/2011 | Lauridsen et al. | |
| 7,961,866 B1 | 6/2011 | Boutcher et al. | |
| 7,995,717 B2 | 8/2011 | Conway et al. | |
| 8,000,989 B1 | 8/2011 | Kiefhaber et al. | |
| 8,010,607 B2 | 8/2011 | McCormack et al. | |
| 8,094,790 B2 | 1/2012 | Conway et al. | |
| 8,126,133 B1 | 2/2012 | Everingham et al. | |
| 8,140,441 B2 | 3/2012 | Cases et al. | |
| 8,175,253 B2 | 5/2012 | Knott et al. | |
| 8,229,102 B2 | 7/2012 | Knott et al. | |
| 8,234,141 B1 * | 7/2012 | Flockhart | H04M 3/5233 |
| | | | 705/7.13 |
| 8,249,245 B2 | 8/2012 | Jay et al. | |
| 8,295,471 B2 | 10/2012 | Spottiswoode et al. | |
| 8,300,798 B1 | 10/2012 | Wu et al. | |
| 8,306,212 B2 | 11/2012 | Arora | |
| 8,359,219 B2 | 1/2013 | Chishti et al. | |
| 8,433,597 B2 | 4/2013 | Chishti et al. | |
| 8,472,611 B2 | 6/2013 | Chishti | |
| 8,565,410 B2 | 10/2013 | Chishti et al. | |
| 8,612,272 B1 * | 12/2013 | Aykin | G06Q 10/0631 |
| | | | 705/7.22 |
| 8,634,542 B2 | 1/2014 | Spottiswoode et al. | |
| 8,644,490 B2 | 2/2014 | Stewart | |
| 8,670,548 B2 * | 3/2014 | Xie | H04M 3/5232 |
| | | | 379/266.01 |
| 8,699,694 B2 | 4/2014 | Chishti et al. | |
| 8,712,821 B2 | 4/2014 | Spottiswoode | |
| 8,718,271 B2 | 5/2014 | Spottiswoode | |
| 8,724,797 B2 | 5/2014 | Chishti et al. | |
| 8,731,178 B2 | 5/2014 | Chishti et al. | |
| 8,737,595 B2 | 5/2014 | Chishti et al. | |
| 8,750,488 B2 | 6/2014 | Spottiswoode et al. | |
| 8,761,380 B2 | 6/2014 | Kohler et al. | |
| 8,781,100 B2 | 7/2014 | Spottiswoode et al. | |
| 8,781,106 B2 | 7/2014 | Afzal | |
| 8,787,552 B1 * | 7/2014 | Zhao | G06Q 10/0639 |
| | | | 379/265.06 |
| 8,792,630 B2 | 7/2014 | Chishti et al. | |
| 8,824,658 B2 | 9/2014 | Chishti | |
| 8,831,207 B1 | 9/2014 | Agarwal | |
| 8,879,715 B2 | 11/2014 | Spottiswoode et al. | |
| 8,903,079 B2 | 12/2014 | Xie et al. | |
| 8,913,736 B2 | 12/2014 | Kohler et al. | |
| 8,929,537 B2 | 1/2015 | Chishti et al. | |
| 8,938,063 B1 | 1/2015 | Hackbarth et al. | |
| 8,995,647 B2 | 3/2015 | Li et al. | |
| 9,020,137 B2 | 4/2015 | Chishti et al. | |
| 9,025,757 B2 | 5/2015 | Spottiswoode et al. | |
| 9,215,323 B2 | 12/2015 | Chishti | |
| 9,277,055 B2 | 3/2016 | Spottiswoode et al. | |
| 9,288,325 B2 | 3/2016 | Chishti et al. | |
| 9,300,802 B1 | 3/2016 | Chishti | |
| 9,313,332 B1 | 4/2016 | Kumar et al. | |
| 9,426,296 B2 | 8/2016 | Chishti et al. | |
| 9,692,898 B1 * | 6/2017 | Chishti | H04M 3/5233 |
| 9,712,676 B1 | 7/2017 | Chishti | |
| 9,712,679 B2 | 7/2017 | Chishti et al. | |
| 9,824,130 B1 * | 11/2017 | Korshunov | G06F 16/27 |
| 9,930,180 B1 | 3/2018 | Kan et al. | |
| 9,942,405 B1 | 4/2018 | Kan et al. | |
| 10,135,987 B1 | 11/2018 | Chishti et al. | |
| 11,144,344 B2 * | 10/2021 | Delker | G06F 9/4881 |
| 2001/0032120 A1 | 10/2001 | Stuart et al. | |
| 2002/0018554 A1 | 2/2002 | Jensen et al. | |
| 2002/0046030 A1 | 4/2002 | Haritsa et al. | |

(56)  References Cited

U.S. PATENT DOCUMENTS

| | | |
|---|---|---|
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0015973 A1 | 1/2004 | Skovira |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0109797 A1 | 5/2008 | Khetarpal et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0305172 A1 | 12/2009 | Tanaka et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2010/0303225 A1* | 12/2010 | Shashkov ........... H04M 3/5175 |
| | | 379/265.11 |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2011/0310773 A1 | 12/2011 | Iyengar et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0022195 A1 | 1/2013 | Nimmagadda |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0334619 A1* | 11/2014 | Placiakis ............ H04M 3/5233 |
| | | 379/265.12 |
| 2014/0341370 A1 | 11/2014 | Li et al. |
| 2015/0055772 A1 | 2/2015 | Klemm et al. |
| 2015/0237209 A1* | 8/2015 | Chishti .............. H04M 3/5233 |
| | | 379/265.11 |
| 2015/0281448 A1 | 10/2015 | Putra et al. |
| 2016/0080573 A1 | 3/2016 | Chishti |
| 2016/0295020 A1* | 10/2016 | Shaffer ............... H04M 3/5235 |
| 2017/0064080 A1 | 3/2017 | Chishti et al. |
| 2017/0064081 A1 | 3/2017 | Chishti et al. |
| 2017/0316438 A1 | 11/2017 | Konig et al. |
| 2018/0054525 A1* | 2/2018 | Mezhibovsky ..... H04M 3/5175 |
| 2018/0191902 A1 | 7/2018 | Chishti |
| 2020/0014801 A1* | 1/2020 | Mohiuddin ....... G06Q 10/06393 |

FOREIGN PATENT DOCUMENTS

| | | |
|---|---|---|
| AU | 2009311534 B2 | 8/2014 |
| AU | 2015203175 A1 | 7/2015 |
| AU | 2015243001 A1 | 11/2015 |
| CN | 101093590 A | 12/2007 |
| CN | 102164073 A | 8/2011 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| EP | 0493292 A2 | 7/1992 |
| EP | 0863651 A2 | 9/1998 |
| EP | 0949793 A1 | 10/1999 |
| EP | 1011974 A1 | 6/2000 |

(56)        References Cited

FOREIGN PATENT DOCUMENTS

| EP | 1032188 A1 | 8/2000 |
|---|---|---|
| EP | 1107557 A2 | 6/2001 |
| EP | 1335572 A2 | 8/2003 |
| GB | 2339643 A | 2/2000 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-507420 A | 6/2000 |
| JP | 2000-236393 A | 8/2000 |
| JP | 2000-253154 A | 9/2000 |
| JP | 2001-292236 A | 10/2001 |
| JP | 2001-518753 A | 10/2001 |
| JP | 2002-069168 A | 3/2002 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2009-081627 A | 4/2009 |
| JP | 2011-511533 A | 4/2011 |
| JP | 2011-511536 A | 4/2011 |
| JP | 2012-075146 A | 4/2012 |
| JP | 5421928 B2 | 2/2014 |
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/17517 A1 | 4/1999 |
| WO | WO-00/70849 A2 | 11/2000 |
| WO | WO-2001/063894 A2 | 8/2001 |
| WO | WO-2006/124113 A2 | 11/2006 |
| WO | WO-2008/124113 A1 | 10/2008 |
| WO | WO-2009/097018 A1 | 8/2009 |
| WO | WO-2009/097210 A1 | 8/2009 |
| WO | WO-2010/053701 A2 | 5/2010 |
| WO | WO-2011/081514 A1 | 7/2011 |
| WO | WO-2013/148453 A1 | 10/2013 |
| WO | WO-2016/048290 A1 | 3/2016 |

OTHER PUBLICATIONS

Cleveland, William S., "Robust Locally Weighted Regression and Smoothing Scatterplots," Journal of the American Statistical Association, vol. 74, No. 368, pp. 829-836 (Dec. 1979) (8 pages).

Cormen, T. H., et al., "Introduction to Algorithms," 3rd Edition, Chapter 26 Maximum Flow, pp. 708-766 and Chapter 29 Linear Programming, pp. 843-897 (2009) (116 pages).

D. Shukla, "A Markov Chain Model for the Analysis of Round-Robin Scheduling Scheme", Journal of Advanced Networking and Applications, vol. 1, No. 1, pp. 1-7 (2009) (Year: 2009).

Gans, N. & Zhou, Y., "Call-Routing Schemes for Call-Center Outsourcing", Manufacturing & Service Operations Management, 9(1), pp. 33-50. http://dx.doi.org/10.1287/msom.1060.0119, University of Pennsylvania. 2005 (Year: 2005).

Gans, N. et al., "Telephone Call Centers: Tutorial, Review and Research Prospects," Manufacturing & Service Operations Management, vol. 5, No. 2, 2003, pp. 79-141, (84 pages).

Koole, G. (2004). "Performance Analysis and Optimization in Customer Contact Centers," Proceedings of the Quantitative Evaluation of Systems, First International Conference, Sep. 27-30, 2004 (4 pages).

Koole, G. et al., "An Overview of Routing and Staffing Algorithms in Multi-Skill Customer Contact Centers," Manuscript, Mar. 6, 2006, (42 pages).

Mor Armo, "Fair Dynamic Routing in Large-Scale Heterogeneous-Server Systems" Informs, Operations Research, vol. 58, No. 3, May-Jun. 2010, pp. 624-637, ISSN 0030-364X | eissn 1526-5463 1 10 1 5803 1 0624. (Year: 2010).

Nocedal, J. and Wright, S. J., "Numerical Optimization," Chapter 16 Quadratic Programming, pp. 448-496 (2006) 50 pages.

Ntzoufras, "Bayesian Modeling Using Winbugs". Wiley Interscience, Chapter 5, Normal Regression Models, Oct. 18, 2007, Redacted version, pp. 155-220 (67 pages).

Press, W. H. and Rybicki, G. B., "Fast Algorithm for Spectral Analysis of Unevenly Sampled Data," The Astrophysical Journal, vol. 338, pp. 277-280 (Mar. 1, 1989) (4 pages).

Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591 (8 pages).

Stanley et al., "Improving Call Center Operations Using Performance-Based Routing Strategies," California Journal of Operations Management, 6(1), 24-32, Feb. 2008; retrieved from http://userwww.sfsu.edu/saltzman/Publist.html (9 pages).

* cited by examiner

Task Assignment System
100

Workforce Management Method
500

510 — Consider a set of a plurality numbers, each number representing a number of agents to be employed in task assignment system 520 — Generate an estimated return on investment (ROI) for each number in the set 530 — Select the number from the step with a highest estimated ROI 540 — Staff task assignment system with the selected number of agents

TECHNIQUES FOR WORKFORCE MANAGEMENT IN A TASK ASSIGNMENT SYSTEM

CROSS-REFERENCE TO RELATED APPLICATIONS

This application is a continuation of U.S. patent application Ser. No. 17/572,030, filed on Jan. 10, 2022, which is a continuation of U.S. patent application Ser. No. 15/993,498, filed on May 30, 2018 (now U.S. Pat. No. 11,250,359). The disclosures of each of the identified applications are incorporated herein by reference in their entirety.

This patent application is related to U.S. patent application Ser. No. 15/395,469, filed Dec. 30, 2016, and co-pending U.S. patent application Ser. No. 15/993,496, filed May 30, 2018, which are hereby incorporated by reference herein in their entirety.

FIELD OF THE DISCLOSURE

This disclosure generally relates to pairing tasks and agents in a task assignment system and, more particularly, to techniques for workforce management in a task assignment system.

BACKGROUND OF THE DISCLOSURE

A typical task assignment system algorithmically assigns tasks (or contacts) arriving at the task assignment system to agents available to handle those tasks. At times, the task assignment system may have agents available and waiting for assignment to inbound or outbound tasks (e.g., telephone calls, Internet chat sessions, email). At other times, the task assignment system may have tasks waiting in one or more queues for an agent to become available for assignment.

In some typical task assignment systems, tasks are assigned to agents based on time of arrival, and agents receive tasks based on the time when those agents became available. This strategy may be referred to as a "first-in, first-out," "FIFO," or "round-robin" strategy. In other typical task assignment systems, other strategies may be used, such as "performance-based routing," or a "PBR," strategy.

Typical task assignment systems preferentially minimize overall agent idle time and overall task waiting time. To that end, if tasks are waiting in a queue, a task will be assigned to an agent soon after an agent becomes available for assignment. Similarly, if agents are idle, waiting for tasks to arrive, an agent will be assigned to a task soon after a task becomes available for assignment.

In typical a task assignment system, managers generally try to staff queues with the exact number of agents needed to handle forecasted volume of tasks-no more, no less. This approach tends to maximize 1-to-1 (i.e., one task to one agent) routing as much as possible, minimizing the number of agents waiting idle and the number of tasks waiting in a queue.

However, a workforce management that strives for 1-to-1 routing does not allow a task assignment system to improve or maximize its benefits by using a pairing strategy that is designed to choose among multiple possible pairings.

In view of the foregoing, it may be understood that there may be a need for a workforce management in a task assignment system that improves the efficiency and performance of pairing strategies that are designed to choose among multiple possible pairings.

SUMMARY OF THE DISCLOSURE

Techniques for workforce management in a task assignment system are disclosed. In one particular embodiment, the techniques may be realized as a method for workforce management in a task assignment system comprising: determining, by at least one computer processor configured to operate in the task assignment system, a first efficiency level of a first task assignment strategy for a first number of agents to be employed in the task assignment system; determining, by the at least one computer processor, a second efficiency level of a second task assignment strategy for a second number of agents to be employed in the task assignment system; comparing, by the at least one computer processor, the first and second efficiency levels; and selecting, by the at least one computer processor, one of the first and second numbers of agents having the higher of the first and second efficiency levels.

In accordance with other aspects of this particular embodiment, the task assignment system may be a contact center system, and wherein the first and second task assignment strategies may assign contacts to contact center system agents.

In accordance with other aspects of this particular embodiment, the first task assignment strategy may be a first-in first-out (FIFO) strategy, and wherein the second task assignment strategy may be a behavioral pairing (BP) strategy.

In accordance with other aspects of this particular embodiment, determining the second efficiency level may be based on an expected gain of using the second task assignment strategy with the second number of agents overusing the first task assignment strategy with the first number of agents.

In accordance with other aspects of this particular embodiment, determining the second efficiency level may be based on a cost of using the second task assignment strategy instead of the first task assignment strategy.

In accordance with other aspects of this particular embodiment, the second number of agents may be less than the first number of agents, and determining the second efficiency level may be based on a savings of using the second number of agents instead of the first number of agents.

In accordance with other aspects of this particular embodiment, determining the second efficiency level may further comprise determining, by the at least one computer processor, a cost of losing a portion of a plurality of tasks by estimating an expected loss of each task out of the portion of the plurality of tasks.

In accordance with other aspects of this particular embodiment, determining the second efficiency level may further comprise applying, by the at least one computer processor, a statistical analysis on historical data recorded by the task assignment system.

In another particular embodiment, the techniques may be realized as a system for workforce management in a task assignment system comprising at least one computer processor configured to operate in the task assignment system, wherein the at least one computer processor is further configured to perform the above method steps:

In another particular embodiment, the techniques may be realized as an article of manufacture for workforce management in a task assignment system comprising a non-transitory computer processor readable medium, and instructions stored on the medium, wherein the instructions may be configured to be readable from the medium by at least one computer processor configured to operate in the task assignment system and thereby cause the at least one computer processor to operate so as to perform the above method steps.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
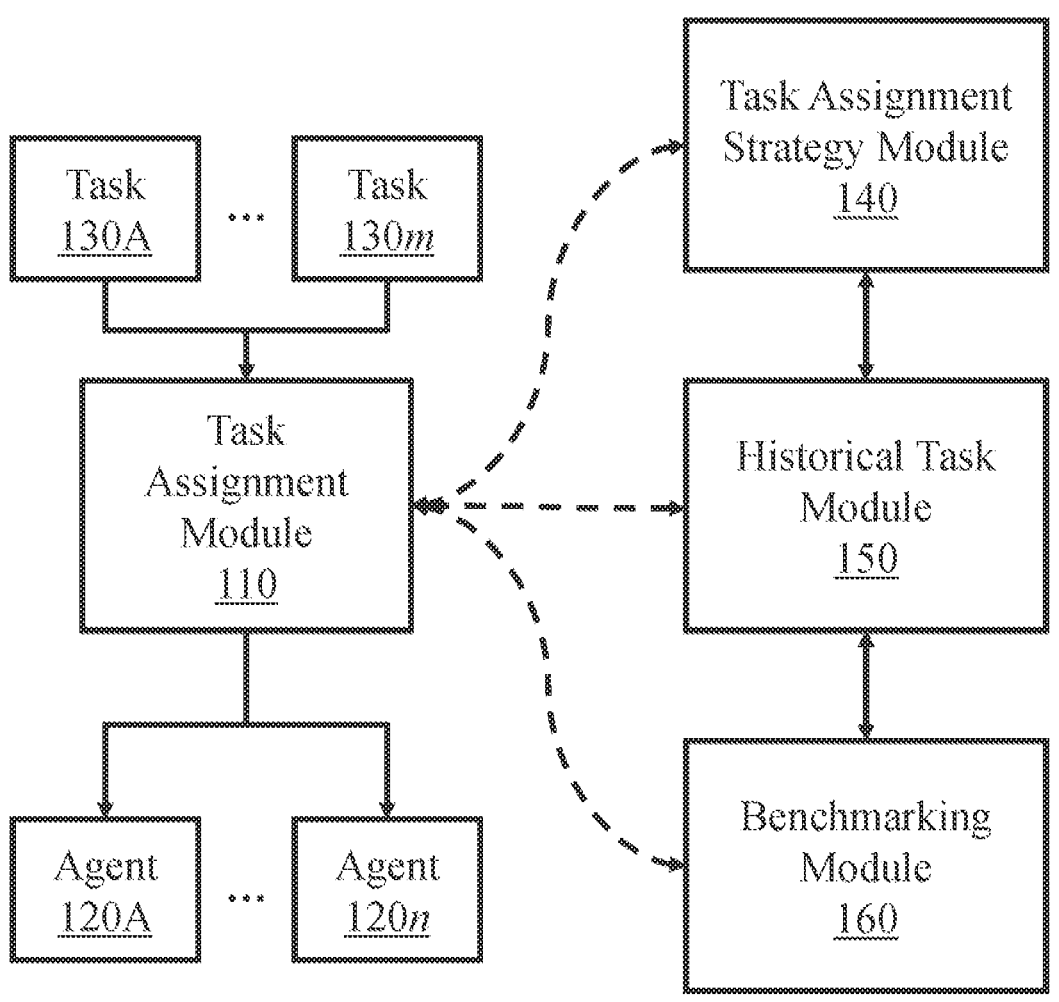
FIG. 1 shows a block diagram of a task assignment system according to embodiments of the present disclosure.

FIG. 1 shows a block diagram of a task assignment system 100 according to embodiments of the present disclosure. The description herein describes network elements, computers, and/or components of a system and method for benchmarking pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the task assignment system 100 may include a task assignment module 110. The task assignment module 110 may include a switch or other type of routing hardware and software for helping to assign tasks among various agents, including queuing or switching components or other Internet-, cloud-, or network-based hardware or software solutions.

The task assignment module 110 may receive incoming tasks. In the example of FIG. 1, the task assignment system 100 receives m tasks over a given period, tasks 130A-130m. Each of the m tasks may be assigned to an agent of the task assignment system 100 for servicing or other types of task processing. In the example of FIG. 1, n agents are available during the given period, agents 120A-120n. m and n may be arbitrarily large finite integers greater than or equal to one. In a real-world task assignment system, such as a contact center, there may be dozens, hundreds, etc. of agents logged into the contact center to interact with contacts during a shift, and the contact center may receive dozens, hundreds, thousands, etc. of contacts (e.g., calls) during the shift.

In some embodiments, a task assignment strategy module 140 may be communicatively coupled to and/or configured to operate in the task assignment system 100. The task assignment strategy module 140 may implement one or more task assignment strategies (or "pairing strategies") for assigning individual tasks to individual agents (e.g., pairing contacts with contact center agents).

A variety of different task assignment strategies may be devised and implemented by the task assignment strategy module 140. In some embodiments, a first-in/first-out ("FIFO") strategy may be implemented in which, for example, the longest-waiting agent receives the next available task (in L1 environments) or the longest-waiting task is assigned to the next available task (in L2 environments). Other FIFO and FIFO-like strategies may make assignments without relying on information specific to individual tasks or individual agents.

In other embodiments, a performance-based routing (PBR) strategy may be used for prioritizing higher-performing agents for task assignment may be implemented. Under PBR, for example, the highest-performing agent among available agents receives the next available task. Other PBR and PBR-like strategies may make assignments using information about specific agents but without necessarily relying on information about specific tasks or agents.

In yet other embodiments, a BP strategy may be used for optimally assigning tasks to agents using information about both specific tasks and specific agents. Various BP strategies may be used, such as a diagonal model BP strategy or a network flow BP strategy. These task assignment strategies and others are described in detail for the contact center context in, e.g., U.S. Pat. Nos. 9,300,802 and 9,930,180, which are hereby incorporated by reference herein.

In some embodiments, a historical task module 150 may be communicatively coupled to and/or configured to operate in the task assignment system 100 via other modules such as the task assignment module 110 and/or the task assignment strategy module 140. The historical task module 150 may be responsible for various functions such as monitoring, storing, retrieving, and/or outputting information about agent task assignments that have already been made. For example, the historical task module 150 may monitor the task assignment module 110 to collect information about task assignments in a given period. Each record of a historical task assignment may include information such as an agent identifier, a task or task type identifier, outcome information, or a pairing strategy identifier (i.e., an identifier indicating whether a task assignment was made using a BP pairing strategy or some other pairing strategy such as a FIFO or PBR pairing strategy).

In some embodiments and for some contexts, additional information may be stored. For example, in a call center context, the historical task module 150 may also store information about the time a call started, the time a call ended, the phone number dialed, and the caller's phone number. For another example, in a dispatch center (e.g., "truck roll") context, the historical task module 150 may also store information about the time a driver (i.e., field agent) departs from the dispatch center, the route recommended, the route taken, the estimated travel time, the actual travel time, the amount of time spent at the customer site handling the customer's task, etc.

The historical task module 150 may also store information about abandoned tasks, which expired or otherwise became abandoned or inoperable prior to assignment to an agent. For example, in a call center context, a caller on hold may decide to hang up and terminate a call before it is answered by an agent. The historical task module 150 may store information about the time a call arrived, the time a call was abandoned, the caller's menu or interactive voice response (IVR) selections, the caller's phone number, etc.

In some embodiments, the historical task module 150 may generate a pairing model or similar computer processor-generate model based on a set of historical assignments or other data, such as lost task data, for a period of time (e.g., the past week, the past month, the past year, etc.), which may be used by the task assignment strategy module 140 to make task assignment recommendations or instructions to the task assignment module 110. In other embodiments, the historical task module 150 may send historical assignment information to another module such as the task assignment strategy module 140 or the benchmarking module 160.

In some embodiments, a benchmarking module 160 may be communicatively coupled to and/or configured to operate in the task assignment system 100 via other modules such as the task assignment module 110 and/or the historical task module 150. The benchmarking module 160 may benchmark the relative performance of two or more pairing strategies (e.g., FIFO, PBR, BP, etc.) using historical assignment information, which may be received from, for example, the historical task module 150. In some embodiments, the benchmarking module 160 may perform other functions, such as establishing a benchmarking schedule for cycling among various pairing strategies, tracking cohorts (e.g., base and measurement groups of historical assignments), etc. The techniques for benchmarking and other functionality performed by the benchmarking module 160 for various task assignment strategies and various contexts are described in later sections throughout the present disclosure. Benchmarking is described in detail for the contact center context in, e.g., U.S. Pat. No. 9,712,676, which is hereby incorporated by reference herein.

In some embodiments, the benchmarking module 160 may output or otherwise report or use the relative performance measurements. The relative performance measurements may be used to assess the quality of the task assignment strategy to determine, for example, whether a different task assignment strategy (or a different pairing model) should be used, or to measure the overall performance (or performance gain) that was achieved within the task assignment system 100 while it was optimized or otherwise configured to use one task assignment strategy instead of another.

Figure 2:
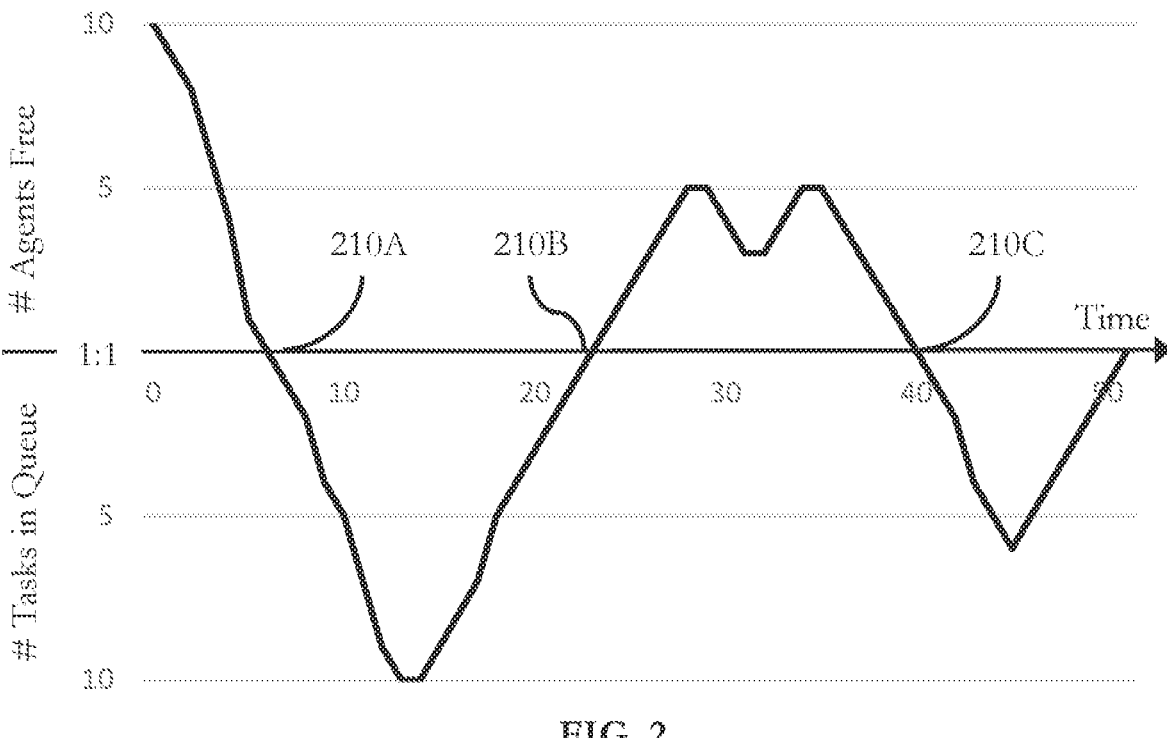
FIG. 2 depicts a schematic representation of a task assignment system timeline according to embodiments of the present disclosure.

FIG. 2 depicts a schematic representation of a task assignment system timeline according to embodiments of the present disclosure. In a given period of time (e.g., over several minutes, several hours, a day), the number of agents free or available to connect to tasks, or the number of tasks waiting in queue, will vary continuously as tasks arrive and depart the task assignment system. The example of FIG. 2 depicts the capacity of a task assignment system over a period of time along the x-axis from time "0" to time "50" (e.g., 0 minutes to 50 minutes). The y-axis depicts the number of free agents or the number of tasks in queue above and below the x-axis, respectively.

At time 0 (e.g., when the task assignment system first opens at the beginning of the day), there are 10 agents available and waiting for tasks to arrive. Periods of time when a task assignment system has a surplus of available agents are referred to as "L1" environments. If a choice-based pairing strategy such as BP is used, the choice-based pairing strategy may choose from among any (or a subset) of the available agents when a task arrives.

As tasks arrive, and agents become occupied while communicating with those tasks, the number of available agents may decrease, as shown in FIG. 2 from time 0 to approximately time 5. The task assignment system is operating in an L1 environment for this entire duration, but the choice available to BP or another choice-based pairing strategy becomes increasingly limited-instead of having as many as ten (or more) agents available to choose among, by about time 5 there are only two or three agents to choose among.

At other periods of time, there may be a shortage of agents, and tasks begin to queue, waiting for agents to become available for connection, as shown in FIG. 2 from about time 7 to about time 21. Periods of time when a task assignment system has a shortage of available agents are referred to as "L2" environments. If a choice-based pairing strategy such as BP is used, the choice-based pairing strategy may choose from among any (or a subset) of the waiting tasks when an agent becomes available.

As agents become available to connect with tasks waiting in the queue, the size of the queue may decrease, as shown in FIG. 2 from approximately time 14 to about time 21. The task assignment system is operating in an L2 environment for this entire duration, but the choice available to BP or another choice-based pairing strategy becomes increasingly limited-instead of having as many as ten (or more) tasks available to choose among at about time 14, by about time 21 there are only two or three tasks in queue to choose among.

At some points in time, a task assignment system will transition from an L1 state to an L2 state (e.g., point 210A at about time 6 and point 210C at about time 40) or vice versa, from an L2 state to an L1 state (e.g., point 210B at about time 23). These crossover points along the x-axis (labeled the "1:1" line) occur when no choice is available to BP or another choice-based pairing strategy. For example, there may be a single task waiting in queue, which may be paired with whichever agent happens to become free next. Or there may be a single agent waiting idle, which may be paired with whichever task happens to arrive at the task assignment system next.

In some situations (not shown), a task assignment system may reach the "1:1" line and then bounce back up into L1 (or bounce back down into L2). No L1-to-L2 or L2-to-L1 transition occurs, but there is still a time at which no choice is available to BP.

In some situations (not shown), a task assignment system may remain along the "1:1" line for an extended period of time. In fact, a typical task assignment system may consider this line to indicate when the task assignment system is operating at a "perfect" capacity, with neither a surplus nor a shortage of agents for the given level of demand (e.g., number, frequency, and duration of tasks arriving at the task assignment system). In these situations, a BP strategy could go for an extended period of time with no choices available other than the "1 agent:1 task" default choice.

These points in time (or periods of time) when the task assignment system is operating along the "1:1" line, when a task assignment system has neither a surplus nor a shortage of available agents, are referred to as "L0" environments.

Figure 3:
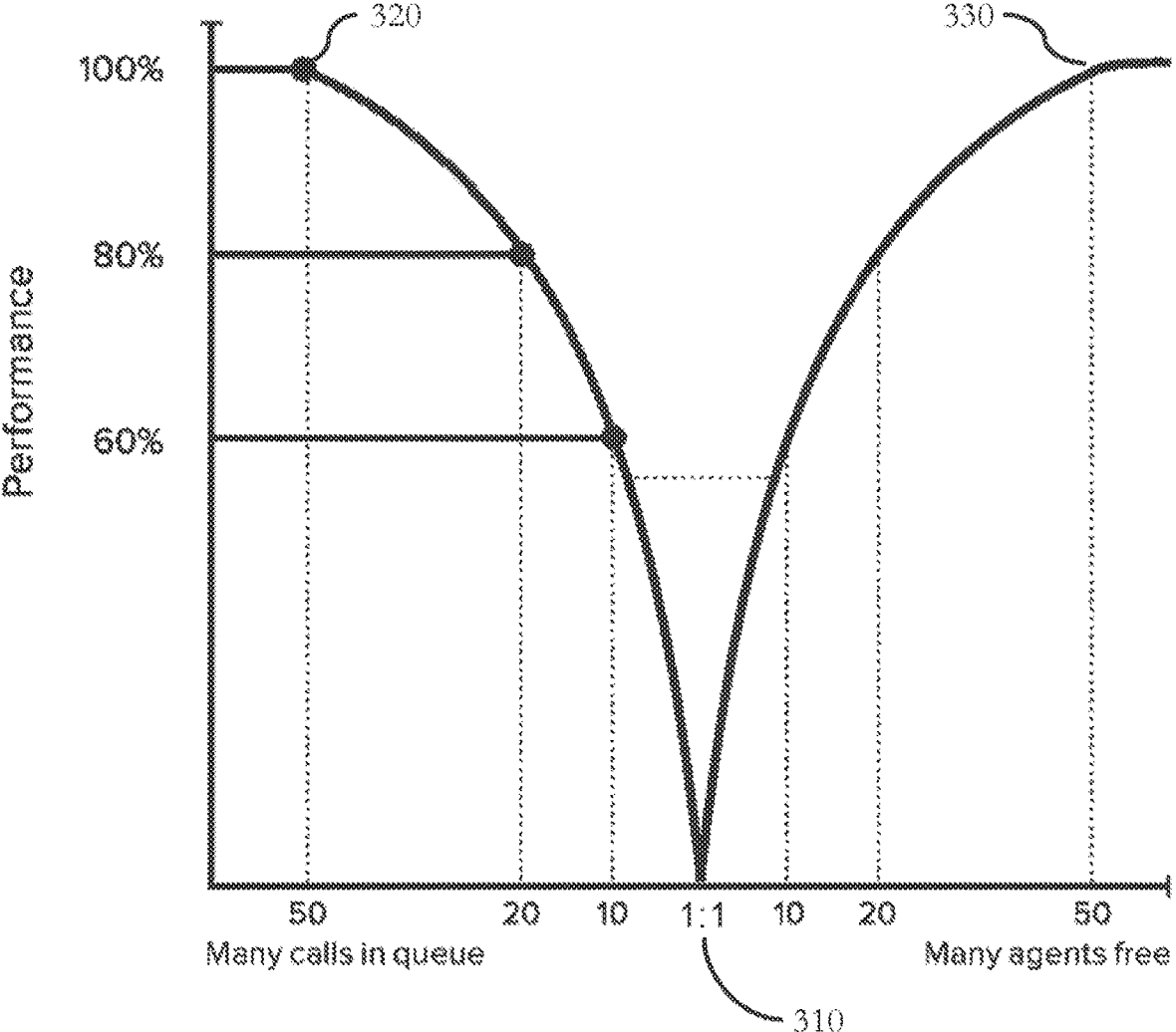
FIG. 3 depicts a schematic representation of a choice-based pairing strategy according to embodiments of the present disclosure.

FIG. 3 depicts a schematic representation of a choice-based pairing strategy according to embodiments of the present disclosure. When choice is limited, choice-based pairing strategies may suffer from suboptimal performance. FIG. 3 shows an example of a performance estimate or performance simulation of a choice-based pairing strategy. When there are many tasks in queue ("many calls in queue" as in FIG. 3) (e.g., at point 320), or when there are many agents free (e.g., at point 330), BP or another choice-based pairing strategy may perform optimally (e.g., at or near "100%" instant performance or efficiency).

However, as the number of tasks in queue or free agents dwindle, there are fewer choices available to BP, and the performance or efficiency of BP could drop. In an L0 environment (e.g., at point 310), the instant performance or efficiency of BP is considered to be 0%, insofar as BP (without L3 pairing) is incapable of making a choice different from the pairing that any other non-L3 pairing strategy could make. In other words, if there is only one task waiting for an agent, and only one agent waiting for a task, both FIFO and BP will pair that one task with that one agent, with no other choice to make. As choice increases, either as tasks fill a queue in an L2 environment, or more agents become available in an L1 environment, performance steadily increases toward optimal instant performance.

In the example of FIG. 3, 50 calls in queue and 50 agents free are the points 320 and 330 at which this pairing strategy is expected to reach peak performance. However, in other embodiments or real-world task assignment systems, peak performance may be reached at varying levels of agent shortage or surplus (e.g., greater than 3 choices available, greater than 7 choices available, greater than 20 choices available, etc.).

In situations such as L0 environments in which the choice available to BP is too limited, it may be advantageous to delay or otherwise postpone connecting an agent to a task. Introducing a delay could allow time for another agent or another task to become available. If a task assignment system is operating in L0, and another agent arrives, the task assignment system will enter an L1 environment with two agents to choose between instead of being forced into the default selection. Similarly, if a task assignment system is operating in L0, and another task arrives, the task assignment system will enter an L2 environment with two tasks to choose between instead of being forced into the default selection.

In some embodiments, it may be desirable to delay even if the task assignment system already has some choice (e.g., already operating in L1 or L2), but the choice is limited. For example, if only ten tasks are waiting in queue when an agent becomes available, the pairing strategy of FIG. 3 is expected to have an instant performance of only 60%. It may be desirable to delay until closer to twenty tasks are waiting, at which point the expected instant performance would be closer to 80%.

When a delay is permitted, it is possible to enter a hybrid environment that is neither pure L1 nor pure L2. For example, consider a task assignment system in which there are two tasks in queue, and only one agent is available.

Following a delay, a second agent could become available, resulting in an environment in which there are multiple tasks in queue and multiple agents available for connection. Periods of time when a task assignment system has multiple tasks in queue and multiple free agents are referred to as "L3" environments.

It is possible for a pairing module to perform or otherwise emulate a FIFO or FIFO-like pairing strategy while the task assignment system is in a L1 (agent surplus), L2 (task surplus), or L3 (multiple agents and multiple tasks) state. In these situations, the pairing module may always pair, for example, the longest-waiting task (or the higher-priority task) at the head of the queue with, for example, the longest-waiting agent, regardless of the other tasks in queue and available agents. In this sense, a FIFO pairing strategy is indifferent to L1, L2, and L3 environments, operating no more or less efficiently as in an L0 state. However, a choice-based pairing strategy such as BP can operate at higher average performance/efficiency when L1/L2/L3 states, with increased choice, are possible.

In some embodiments, a pairing module (e.g., task assignment strategy module 140) or a similar module may be capable of making an automated workforce management recommendation or decision within the task assignment system. For example, instead of preferentially trying to minimize task hold time and agent free time, which causes the task assignment system to hover around L0 or in periods of L1 and L2 with limited amounts of choice, the task assignment system could be advised or instructed to use a certain number of agents that is likely to keep the task assignment system in high-choice environments. In some situations, the recommendation could be to staff additional agents (e.g., 10 additional agents, 100 additional agents, etc.) to increase the expected amount of time spent in high-choice L1. In other situations, the recommendation could be to staff fewer agents (e.g., 10 fewer agents, 100 fewer agents, etc.) to increase the expected amount of time spent in high-choice L2.

In some embodiments, the workforce management instruction or recommendation may balance the cost of employing additional agents and increasing agent free time against the benefit of reducing task wait time, or balancing the cost-savings of employing fewer agents and decreasing agent free time against the cost of increasing task wait time. These recommendations may take into account the desired metric to optimize. For example, if the task assignment system management desires to optimize customer satisfaction, it may be desirable to make a recommendation that errs on being in high-choice L1 (agent surplus) rather than high-choice L2 (agent shortage). In either case, the recommendation or instruction may balance the cost of increasing agent free time or increasing task wait time against the improved performance/efficiency of BP or another choice-based pairing strategy operating in higher-choice L1, L2, or L3 environments, and avoiding inefficient L0 environments in which only a default choice is available.

In some embodiments, the workforce management instruction or recommendation may be in the form of an estimated return on investment (ROI) of either employing additional agents or employing fewer agents. In a task assignment system, an ROI may be viewed as a monetary efficiency level. The estimated ROI may be defined by the following formulas:

$$\text{Estimated } ROI = \frac{\begin{array}{c}(\text{Profit with } BP \text{ and more (or fewer) agents} - \\ \text{Profit without } BP \text{ and more (or fewer) agents})\end{array}}{\text{Costs of } BP \text{ technology and more (or fewer) agents}}$$

-continued

Profit without *BP* and more (or fewer) agents =

Potential benefits from all tasks − Harm from lost tasks−Costs of agents

Profit with *BP* and more (or fewer) agents =

Potential benefits from all tasks +

Gain from *BP* − Harm from lost tasks − Costs of agents

In the above formulas, the potential benefits from all tasks may be treated as being fixed, regardless of the number of agents. However, in some embodiments using BP strategies, the benefits from all tasks may be different due to optimized task-agent pairing.

The harm from lost tasks, which depends on the number of agents, may be estimated from a survival/hazard analysis or a conversion rate analysis.

Figure 4:
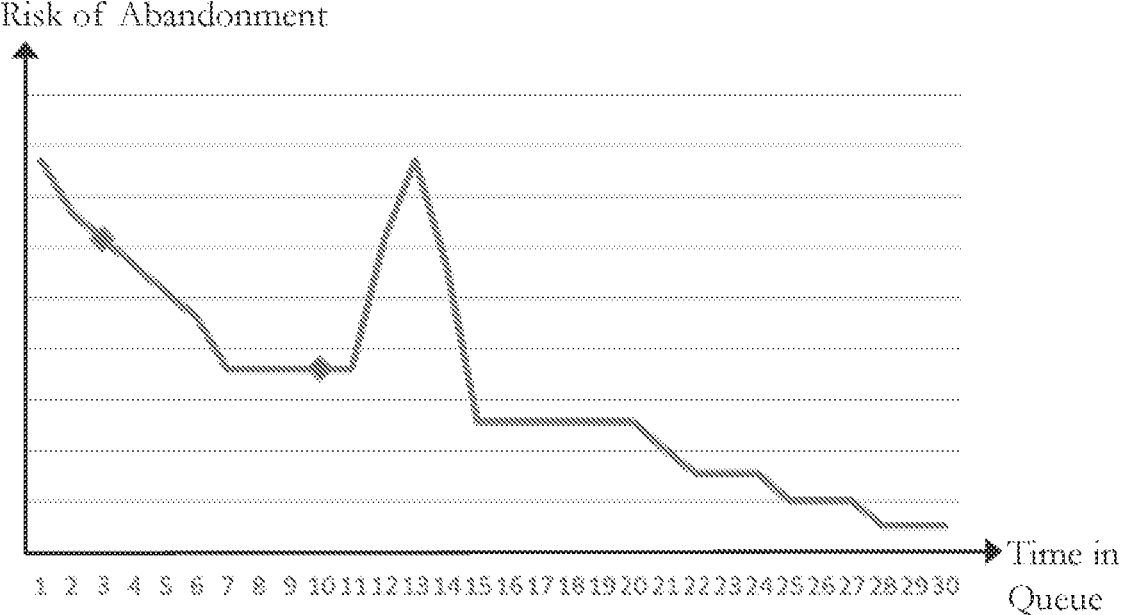
FIG. 4 depicts a schematic representation of timeline of a risk of abandonment of a task according to embodiments of the present disclosure.

In a survival/hazard analysis, a hazard function may be used to determine the expected loss of each task. An example of a hazard function is illustrated in FIG. 4. As shown in this example, the risk of abandonment of each task (e.g., a caller hanging up and terminating a call) may depend on how long the task has been waiting in queue. In this example, the risk of abandonment during the first seconds after the task arrived is high. The risk begins to drop and then rises again on average around the 13th second.

Different queues in different task assignment systems may exhibit hazard functions with different characteristics. Hazard functions may be generated from historical information (e.g., starting times and ending times of calls) recorded by the task assignment systems. The time window for the hazard function may be chosen based on a task frequency rate (e.g., calls arrive about once every five seconds).

Given a hazard function, the expected loss of each task may be determined according to the following formula:

$$\text{Expected loss=Risk of abandonment} \times \text{Expected outcome}$$

In this formula, the expected outcome of each task may be known or estimated based on outcomes of historical task-agent assignments in a task assignment system. For example, if the tasks are sales calls, each sales call may have an expected outcome, which may depend on the caller or type of caller, the item being sold, and the likelihood of the agent making the sale. The harm from lost tasks thus may be estimated from the expected losses of tasks in queue.

In a conversion rate analysis, the harm from lost tasks may be estimated from conversion rates of tasks based on historical data recorded by a task assignment system. For each task, an expected conversion rate may be a function of the task waiting in queue. In some environments, conversion rate may be directly correlated with waiting time. For example, in a sales queue of a contact center, a contact may be more likely to wait in queue if the contact has a strong intention to buy or order an item.

The gain from BP may be determined from historical data recorded by a task assignment system and a statistical analysis (e.g., a Bayesian analysis) to establish a dependence between task-agent pairing choices (which depend on the number of agents) and gain in L1, L2, and/or L3 environments (e.g., FIG. 3). Alternatively, a task assignment system may be simulated using a simulator to estimate such a dependence.

A pairing module (e.g., task assignment strategy module 140) or a similar module may estimate a plurality of ROIs for a plurality of numbers of agents-more or fewer than the number of agents typically employed. The highest (positive) estimated ROI may then inform the task assignment system of the optimal number of agents to employ in order to maximize the benefits of using a BP strategy. In some instances, the recommended number of agents may be higher than the number of agents typically employed, and the task assignment system may operate in a higher-choice L1 (agent-surplus) environment more often. In other instances, the recommended number of agents may be lower than the number of agents typically employed, and the task assignment system may operate in a higher-choice L2 (task-surplus) environment more often.

In a task assignment system, the ROI may be estimated by a calculator. The calculator may be implemented as a web-based, app-based, etc. user interface. The calculator may generate reports (e.g., PDF, Word, spreadsheets, etc.), which may be used for workforce management, sales, account management, or further statistical analysis.

Figure 5:
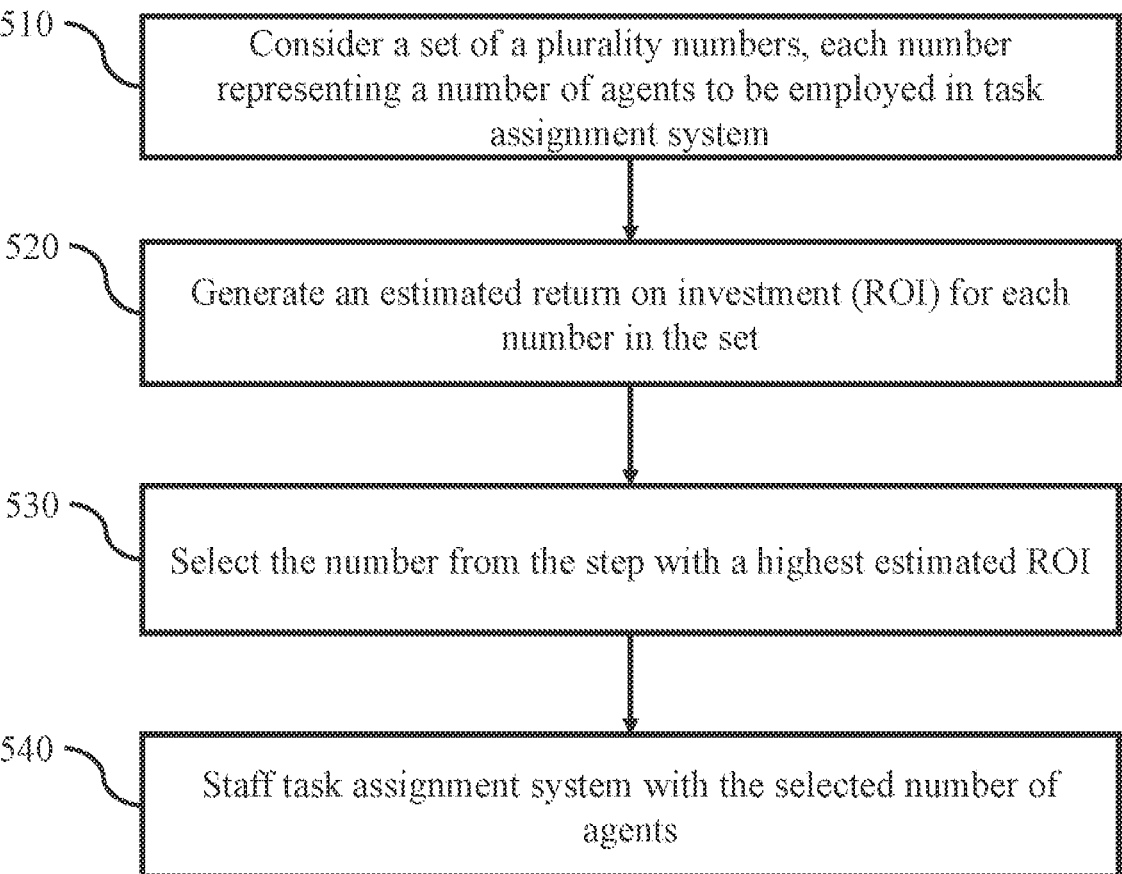
FIG. 5 shows a flow diagram of a workforce management method according to embodiments of the present disclosure.

FIG. 5 shows a flow diagram of a workforce management method 500 according to embodiments of the present disclosure. Workforce management method 500 may begin at block 510. At block 510, a set of a plurality of (integer) numbers (e.g., {10, 11, 12, . . . , 1000}) may be considered. Each number in the set may represent a number of agents to be employed in a task assignment system. Workforce management method 500 may then proceed to block 520. At block 520, for each number in the set, an estimated ROI may be generated, as described above. At block 530, workforce management method 500 may select the number in the set that results in a highest estimated ROI. Workforce management method 500 may proceed to block 540, where the task assignment system may be staffed with the selected number of agents.

At this point it should be noted that estimating ROI in a task assignment system in accordance with the present disclosure as described above may involve the processing of input data and the generation of output data to some extent. This input data processing and output data generation may be implemented in hardware or software. For example, specific electronic components may be employed in a pairing module or similar or related circuitry for implementing the functions associated with estimating ROI in a task assignment system in accordance with the present disclosure as described above. Alternatively, one or more processors operating in accordance with instructions may implement the functions associated with estimating ROI in a task assignment system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for a task assignment system, the method comprising:

determining, by at least one computer processor configured to perform workforce management operations in the task assignment system, that the task assignment system is in a first state, wherein at the time that the task assignment system is determined to be in the first state, there are $N_1$ number of agents available for pairing and further wherein $N_1$ is a non-negative integer;

after determining that the task assignment system is in the first state, calculating, by said at least one computer processor, first value which indicates an estimated result of performing pairings with $N_{Increased}$ number of agents, wherein $N_{Increased}$ is obtained as a result of increasing $N_1$; and a second value which indicates an estimated result of performing pairings with $N_{Decreased}$ number of agents, wherein $N_{Decreased}$ is obtained as a result of decreasing $N_1$; and based on the comparison of the first and second values, determining whether to increase or decrease the $N_1$ number of agents;

storing, in a task queue, information regarding a task waiting to be paired with an available agent; and establishing a communication link between an agent available for pairing and the task waiting to be paired with an available agent, wherein establishing the communication link between the agent and the task comprises using a switch of the task assignment system to establish the communication link, either increasing or decreasing the $N_1$ number of agents causes the task assignment system to transition from the first state to a second state which is different from the first state, each of the first and second values is calculated based on:

a profit associated with performing pairings using a certain pairing strategy with the $N_{Increased}$ number of agents or the $N_{Decreased}$ number of agents;

a profit associated with performing pairings without using a certain pairing strategy with the $N_{Increased}$ number of agents or the $N_{Decreased}$ number of agents; and a cost associated with performing pairings using a certain pairing strategy with the $N_{Increased}$ number of agents or the $N_{Decreased}$ number of agents, the profit associated with performing pairings using the certain pairing strategy with the $N_{Increased}$ number of agents or the $N_{Decreased}$ number of agents is determined based at least on an expected loss of each of one or more tasks, the expected loss of each of said one or more tasks is determined using a hazard function, and the hazard function indicates a likelihood that a task will be lost with respect to a waiting time duration of the task.

2. The method of claim 1, wherein the method comprises:

after determining that the task assignment system is in the first state, calculating, by said at least one computer processor, a plurality of values each of which indicates an estimated result of performing pairings with each of candidate numbers of agents, wherein the candidate numbers of agents include $N_{Increased}$ and $N_{Decreased}$;

comparing the plurality of values with each other; and based on the comparison of the plurality of values, selecting one of the candidate numbers of agents.

3. The method of claim 1, wherein the first value which indicates the estimated result of performing pairings with the $N_{increased}$ number of agents is calculated based on a profit associated with performing pairings with the $N_{increased}$ number of agents, and the second value which indicates the estimated result of performing pairings with the $N_{Decreased}$ number of agents is calculated based on a profit associated with performing pairings with the $N_{Decreased}$ number of agents.

4. The method of claim 1, wherein the certain pairing strategy is a behavioral pairing strategy.

5. The method of claim 1, wherein whether to increase or decrease the $N_1$ number of agents is determined based on a metric, and the metric is related to one or more of:

a cost related to increasing the $N_1$ number of agents;

a benefit related to decreasing the $N_1$ number of agents;

a cost related to increasing a time duration during which agents are waiting to be paired;

a benefit related to decreasing a time duration during which agents are waiting to be paired;

a cost related to increasing a time duration during which tasks are waiting to be paired; and/or a benefit related to decreasing a time duration during which tasks are waiting to be paired.

6. A task assignment system comprising:

at least one memory; and at least one computer processor configured to perform workforce management operations in the task assignment system, wherein the task assignment system is configured to:

determine that the task assignment system is in a first state, wherein at the time that the task assignment system is determined to be in the first state, there are $N_1$ number of agents available for pairing and further wherein $N_1$ is a non-negative integer; and after determining that the task assignment system is in the first state, calculate:

a first value which indicates an estimated result of performing pairings with $N_{Increased}$ number of agents, wherein $N_{Increased}$ is obtained as a result of increasing $N_1$; and a second value which indicates an estimated result of performing pairings with $N_{Decreased}$ number of agents, wherein $N_{Decreased}$ is obtained as a result of decreasing $N_1$; and based on the comparison of the first and second values, determine whether to increase or decrease the $N_1$ number of agents;

storing, in a task queue, information regarding a task waiting to be paired with an available agent; and establishing a communication link between an agent available for pairing and the task waiting to be paired with an available agent, wherein establishing the communication link between the agent and the task comprises using a switch of the task assignment system to establish the communication link, and either increasing or decreasing the $N_1$ number of agents causes the task assignment system to transition from the first state to a second state which is different from the first state each of the first and second values is calculated based on:

a profit associated with performing pairings using a certain pairing strategy with the $N_{Increased}$ number of agents or the $N_{Decreased}$ number of agents;

a profit associated with performing pairings without using a certain pairing strategy with the $N_{Increased}$ number of agents or the $N_{Decreased}$ number of agents; and a cost associated with performing pairings using a certain pairing strategy with the $N_{Increased}$ number of agents or the $N_{Decreased}$ number of agents, the profit associated with performing pairings using the certain pairing strategy with the $N_{Increased}$ number of agents or the $N_{Decreased}$ number of agents is determined based at least on an expected loss of each of one or more tasks, the expected loss of each of said one or more tasks is determined using a hazard function, and the hazard function indicates a likelihood that a task will be lost with respect to a waiting time duration of the task.

7. The task assignment system of claim 6, wherein the task assignment system is configured to:

after determining that the task assignment system is in the first state, calculate, by said at least one computer processor, a plurality of values each of which indicates an estimated result of performing pairings with each of candidate numbers of agents, wherein the candidate numbers of agents include $N_{Increased}$ and $N_{Decreased}$;

compare the plurality of values with each other; and based on the comparison of the plurality of values, select one of the candidate numbers of agents.

8. The task assignment system of claim 6, wherein the first value which indicates the estimated result of performing pairings with the $N_{increased}$ number of agents is calculated based on a profit associated with performing pairings with the $N_{increased}$ number of agents, and the second value which indicates the estimated result of performing pairings with the $N_{Decreased}$ number of agents is calculated based on a profit associated with performing pairings with the $N_{Decreased}$ number of agents.

9. The task assignment system of claim 6, wherein the certain pairing strategy is a behavioral pairing strategy.

10. The task assignment system of claim 6, wherein whether to increase or decrease the $N_1$ number of agents is determined based on a metric, and the metric is related to one or more of:

a cost related to increasing the $N_1$ number of agents;

a benefit related to decreasing the $N_1$ number of agents;

a cost related to increasing a time duration during which agents are waiting to be paired;

a benefit related to decreasing a time duration during which agents are waiting to be paired;

a cost related to increasing a time duration during which tasks are waiting to be paired; and/or a benefit related to decreasing a time duration during which tasks are waiting to be paired.

11. An article of manufacture comprising:

a non-transitory computer processor readable medium; and instructions stored on the medium, wherein the instructions are configured to be readable from the medium by at least one computer processor configured to perform workforce management operations in a task assignment system, thereby causing the at least one computer processor to operate so as to:

determine that the task assignment system is in a first state, wherein at the time that the task assignment system is determined to be in the first state, there are $N_1$ number of agents available for pairing and further wherein $N_1$ is a non-negative integer; and after determining that the task assignment system is in the first state, calculate:

a first value which indicates an estimated result of performing pairings with $N_{Increased}$ number of agents, wherein $N_{Increased}$ is obtained as a result of increasing $N_1$; and a second value which indicates an estimated result of performing pairings with $N_{Decreased}$ number of agents, wherein $N_{Decreased}$ is obtained as a result of decreasing $N_1$; and based on the comparison of the first and second values, determine whether to increase or decrease the $N_1$ number of agents;

storing, in a task queue, information regarding a task waiting to be paired with an available agent; and establishing a communication link between an agent available for pairing and the task waiting to be paired with an available agent, wherein establishing the communication link between the agent and the task comprises using a switch of the task assignment system to establish the communication link, and either increasing or decreasing the $N_1$ number of agents causes the task assignment system to transition from the first state to a second state which is different from the first state, each of the first and second values is calculated based on:

a profit associated with performing pairings using a certain pairing strategy with the $N_{Increased}$ number of agents or the $N_{Decreased}$ number of agents;

a profit associated with performing pairings without using a certain pairing strategy with the $N_{Increased}$ number of agents or the $N_{Decreased}$ number of agents; and a cost associated with performing pairings using a certain pairing strategy with the $N_{Increased}$ number of agents or the $N_{Decreased}$ number of agents, the profit associated with performing pairings using the certain pairing strategy with the $N_{Increased}$ number of agents or the $N_{Decreased}$ number of agents is determined based at least on an expected loss of each of one or more tasks, the expected loss of each of said one or more tasks is determined using a hazard function, and the hazard function indicates a likelihood that a task will be lost with respect to a waiting time duration of the task.

* * * * *